United States Patent
Ehgartner et al.

(10) Patent No.: US 11,541,747 B2
(45) Date of Patent: Jan. 3, 2023

(54) MOTOR VEHICLE HAVING A PRESSURE VESSEL, AND OPERATING METHOD FOR A MOTOR VEHICLE

(71) Applicant: Bayerische Motoren Werke Aktiengesellschaft, Munich (DE)

(72) Inventors: Lorenz Ehgartner, Ebersberg (DE); Andreas Pelger, Ismaning (DE); Klaus Szoucsek, Haimhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 115 days.

(21) Appl. No.: 17/055,004

(22) PCT Filed: Apr. 9, 2019

(86) PCT No.: PCT/EP2019/058964
§ 371 (c)(1),
(2) Date: Nov. 12, 2020

(87) PCT Pub. No.: WO2019/219298
PCT Pub. Date: Nov. 21, 2019

(65) Prior Publication Data
US 2021/0268896 A1 Sep. 2, 2021

(30) Foreign Application Priority Data
May 18, 2018 (DE) .................... 10 2018 207 895.5

(51) Int. Cl.
*B60K 15/063* (2006.01)
*F17C 5/00* (2006.01)
(Continued)

(52) U.S. Cl.
CPC ............. *B60K 15/063* (2013.01); *F17C 5/00* (2013.01); *F17C 7/00* (2013.01);
(Continued)

(58) Field of Classification Search
CPC . B60K 15/063; B60K 2015/0638; F17C 7/00; F17C 13/026
See application file for complete search history.

(56) References Cited

U.S. PATENT DOCUMENTS 7,426,935 B2 * 9/2008 Schwan .................. F17C 7/00
137/263
8,443,820 B2 * 5/2013 Ulrey ................... F02D 19/027
141/2
(Continued)

FOREIGN PATENT DOCUMENTS

CN 203472526 U 3/2014
CN 105579274 A 5/2016
(Continued)

OTHER PUBLICATIONS

International Search Report (PCT/ISA/210) issued in PCT Application No. PCT/EP2019/058964 dated Jul. 2, 2019 with English translation (five (5) pages).
(Continued)

*Primary Examiner* — Kenneth Rinehart
*Assistant Examiner* — Nicole Gardner
(74) *Attorney, Agent, or Firm* — Crowell & Moring LLP

(57) ABSTRACT

A motor vehicle with a pressure vessel system includes at least a first pressure vessel arranged in a first region of the motor vehicle and at least one second pressure vessel arranged in a second region of the motor vehicle having a lower intrusion probability than the first region. Fuel is preferentially removed first primarily from the at least one first pressure vessel. When the lower limit of fuel level or fuel temperature is reached in the at least one first pressure vessel, fuel is removed from the at least one second pressure vessel. If the fuel supply rate from the at least one first pressure vessel is lower than an overall fuel supply rate for an energy converter, fuel is removed from the at least one
(Continued)

Figure 2:
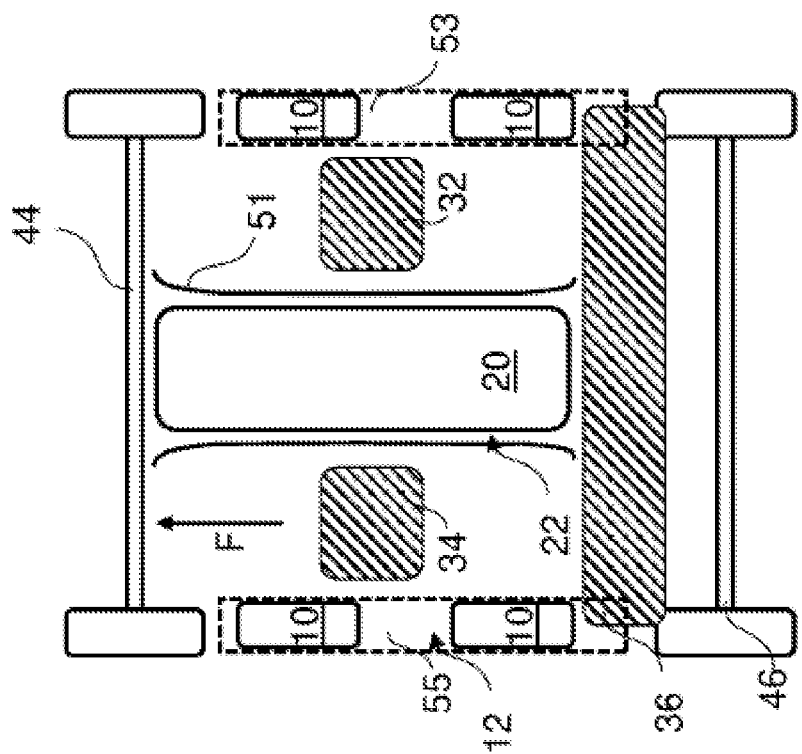

second pressure vessel to meet the overall fuel supply rate needed by the energy converter.

10 Claims, 2 Drawing Sheets

(51) Int. Cl.
  *F17C 7/00* (2006.01)
  *B60L 50/70* (2019.01)
  *B60K 15/03* (2006.01)
  *F02B 43/10* (2006.01)
  *F02M 21/02* (2006.01)

(52) U.S. Cl.
  CPC ............ *B60K 2015/03144* (2013.01); *B60K 2015/03217* (2013.01); *B60K 2015/03315* (2013.01); *B60K 2015/0631* (2013.01); *B60K 2015/0638* (2013.01); *B60L 50/70* (2019.02); *F02B 43/10* (2013.01); *F02B 2043/103* (2013.01); *F02M 21/0221* (2013.01); *F17C 2201/056* (2013.01); *F17C 2205/013* (2013.01); *F17C 2221/012* (2013.01); *F17C 2221/033* (2013.01); *F17C 2223/0123* (2013.01); *F17C 2223/0161* (2013.01); *F17C 2223/036* (2013.01); *F17C 2227/042* (2013.01); *F17C 2227/048* (2013.01); *F17C 2250/0439* (2013.01); *F17C 2250/0443* (2013.01); *F17C 2270/0168* (2013.01); *F17C 2270/0184* (2013.01)

(56) References Cited

U.S. PATENT DOCUMENTS

| | | | |
|---|---|---|---|
| 8,608,202 B2 * | 12/2013 | Dossow | B60K 15/07 280/834 |
| 9,252,440 B2 * | 2/2016 | Yoshida | H01M 8/04089 |
| 2006/0061081 A1 | 3/2006 | Kresse, Jr. et al. | |
| 2012/0080466 A1 | 4/2012 | Schultheis et al. | |
| 2012/0291902 A1 | 11/2012 | Mori et al. | |
| 2014/0109974 A1 | 4/2014 | Zoz | |
| 2014/0234739 A1 | 8/2014 | Sachs et al. | |
| 2016/0236536 A1 | 8/2016 | Hirakata | |
| 2018/0093563 A1 | 4/2018 | Matijevich et al. | |
| 2019/0170299 A1 | 6/2019 | Hettenkofer et al. | |
| 2019/0210452 A1 | 7/2019 | Kato et al. | |

FOREIGN PATENT DOCUMENTS

| | | |
|---|---|---|
| DE | 10 2011 104 711 A1 | 12/2012 |
| DE | 10 2014 101 641 A1 | 8/2014 |
| DE | 10 2016 214 680 A1 | 2/2018 |
| DE | 11 2010 005 543 B4 | 1/2019 |
| DE | 10 2018 201 327 A1 | 8/2019 |
| DE | 10 2018 210 327 A1 | 1/2020 |
| EP | 1 800 930 A1 | 6/2007 |
| JP | 2005-155869 A | 6/2005 |
| JP | 2011-7229 A | 1/2011 |
| JP | 2017-226396 A | 12/2017 |
| WO | WO 2008/074075 A1 | 6/2008 |
| WO | WO 2011/025465 A1 | 3/2011 |

OTHER PUBLICATIONS

German-language Written Opinion (PCT/ISA/237) issued in PCT Application No. PCT/EP2019/058964 dated Jul. 2, 2019 (six (6) pages).

Chinese-language Office Action issued in Chinese Application No. 201980032953.7 dated Nov. 3, 2021 with English translation (14 pages).

German-language Search Report issued in German Application No. 10 2018 207 895.5 dated Mar. 4, 2022 with partial English translation (11 pages).

* cited by examiner

MOTOR VEHICLE HAVING A PRESSURE VESSEL, AND OPERATING METHOD FOR A MOTOR VEHICLE

BACKGROUND AND SUMMARY OF THE INVENTION

The technology disclosed here relates to a motor vehicle having a pressure vessel system. The technology disclosed here furthermore relates to an operating method of a motor vehicle. Motor vehicles having a pressure vessel system are known as such. For example, motor vehicles operated by fuel cells generally have such a pressure vessel system. In order to increase the maximum range, such a pressure vessel system can have a plurality of pressure vessels which can be installed at different points of the motor vehicle. In addition to the requirement of a maximum range, there is also a requirement to design the motor vehicles to be even safer. In respect of the filling of, and the removal from, the plurality of pressure vessels, a multiplicity of different concepts are known from the prior art. For example, the German application originating from the applicant and having the application number DE 10 2018 210327 discloses a method for removing hydrogen from a multi-tank system.

A preferred object of the technology disclosed here is that of reducing or eliminating at least one disadvantage of a previously known solution, or of proposing an alternative solution. In particular, it is a preferred object of the technology disclosed here, with as great a range of the motor vehicle as possible, simultaneously to further increase the safety of the motor vehicle. Further preferred objects may arise from the advantageous effects of the technology disclosed here.

The technology disclosed here relates to a motor vehicle having a pressure vessel system. The motor vehicle can be, for example, a passenger vehicle, a motorcycle or a utility vehicle. The pressure vessel system serves for storing fuel which is gaseous under ambient conditions. The pressure vessel system may be used, for example, in a motor vehicle which is powered using compressed natural gas (CNG) or liquefied natural gas (LNG) or using hydrogen. Such a pressure vessel system here comprises a plurality of pressure vessels, in particular composite overwrapped pressure vessels (COPV). The plurality of pressure vessels can be, for example, cryogenic pressure vessels (CcH2 or COP) or high-pressure gas vessels (CGH2). High-pressure gas vessels are designed, at ambient temperatures, to permanently store fuel at a nominal operating pressure (also called nominal working pressure or NWP) of approximately 350 barg (positive pressure in relation to atmospheric pressure), furthermore preferably of approximately 700 barg or more. A cryogenic pressure vessel is suitable for storing the fuel at the abovementioned operating pressures, even in the presence of temperatures which lie considerably below the operating temperature of the motor vehicle.

The pressure vessel system is designed to supply fuel to at least one energy converter. The at least one energy converter is designed to convert the chemical energy of the fuel into other forms of energy, for example into electrical energy and/or into kinetic energy. The energy converter can be, for example, an internal combustion engine or a fuel cell system/fuel cell stack having at least one fuel cell.

At least one first pressure vessel of the plurality of pressure vessels can be arranged in a first region of the motor vehicle and at least one second pressure vessel of the plurality of pressure vessels can be arranged in a second region of the motor vehicle.

The first region can have a higher intrusion probability than the second region. The term "intrusion probability" within the context of the technology disclosed here is a measure of the probability of other motor vehicles or foreign objects (not belonging to the motor vehicle) penetrating this first or second region. For example, the intrusion probability of the trunk or of the engine compartment is higher than the intrusion probability of the passenger cell. In other words, the first region can be a region which, in the event of a collision of the motor vehicle with an external object (not belonging to the motor vehicle), has a higher plastic deformation probability than the second region. In particular, the second region can be a region of the passenger cell or can be adjacent to the latter, whereas the first region at least partially lies in the crumple zone of the motor vehicle or is adjacent to this crumple zone. Expressed once again in other words, the term intrusion probability in the technology disclosed here could also be replaced by "collision load-bearing capacity". The term collision load-bearing capacity expediently comprises the circumstance here that, in the event of the same crash energy or collision energy acting on the motor vehicle from the outside, a pressure vessel in the first region experiences more contact energy than a pressure vessel in the second region.

At least one first pressure vessel of the plurality of pressure vessels can be at least partially and preferably completely arranged behind the rear seat bench of the motor vehicle and/or at least partially and preferably completely behind the rear axle of the motor vehicle. Such a first pressure vessel may also be referred to as the rear pressure vessel. Such a rear pressure vessel could then be at least partially provided in the trunk floor. In other words, such a rear pressure vessel would therefore generally be arranged in a first region having a higher intrusion probability.

However, a first pressure vessel of the plurality of pressure vessels may, as it were, alternatively or additionally be at least partially and preferably completely accommodated in one of the two sills of the motor vehicle. At least one first pressure vessel can expediently be at least partially accommodated in each sill. The sill is a region of the self-supporting body of a motor vehicle. The sill is expediently located longitudinally below the door entry, on both sides of the vehicle between the wheel houses at the front and rear. Such a first pressure vessel which is at least partially provided in the sill is therefore arranged in a first region which, in particular in comparison to the second region arranged between the sills, has an increased intrusion probability in the event of a side impact.

The second pressure vessel disclosed here can be at least partially and preferably completely arranged in front of the first pressure vessel, in particular when the first pressure vessel is a rear pressure vessel. The second pressure vessel can expediently be at least partially and preferably completely arranged in front of or under the rear seat bench of the motor vehicle and/or can be at least partially and preferably completely arranged in front of the rear axle of the motor vehicle. For example, the second pressure vessel can be at least partially and preferably completely arranged between the sills, particularly preferably at least partially and preferably completely in the center tunnel of the motor vehicle. In one refinement, the second pressure vessel can be arranged between two first pressure vessels.

The motor vehicle and in particular the pressure vessel system can be designed so as to undertake the removal of fuel stored in the plurality of pressure vessels in such a manner (i.e. to subject the removal to closed loop control or open loop control in such a manner) that, when a removal limit value of the pressure vessel that is representative of the lower filling level and/or a limit temperature of the first or rear pressure vessel is reached or fallen short of, the second pressure vessel has a higher filling level.

The filling level of a pressure vessel is a measure of the amount of fuel which is stored in the pressure vessel. The filling level or charging state can be an absolute value, for example the fuel storage pressure or the fuel storage density of the fuel stored in the pressure vessel. However, the filling level can also be a percentage value resulting from the amount actually stored in the pressure vessel and from maximum and minimum storage amounts. Such a percentage value may be referred to, for example, as the state of charge or SoC. The state of charge can be, for example, a percentage value of the maximum fuel storage pressure or density or of the difference between the maximum and minimum fuel storage pressure or density. The maximum fuel storage pressure is generally reached if the pressure vessel under normal conditions has reached the nominal operating pressure (also called nominal working pressure or NWP; for example 700 bar) at a nominal operating temperature (for example 15° C.). The minimum fuel storage pressure can be a defined minimum pressure (generally vessel-specific) or atmospheric pressure. The maximum fuel storage density and the minimum fuel storage density are produced, as it were, under said standard conditions. In the event of a 70 MPa pressure vessel system, the maximum storage density in a hydrogen pressure vessel at 15° C. is, for example, approximately 40.22 g/l. The filling level can be determinable directly or indirectly.

The lower filling level can be, for example, a filling level which corresponds to a minimum fuel storage pressure or a minimum fuel storage density in the pressure vessel. For example, the lower filling level can be a fuel pressure which should always be present, for example 5 bar or 10 bar or 20 bar. Such a value can be predetermined under some circumstances in order to reduce structural damage to the pressure vessel. Alternatively, the lower filling level can correspond to a fuel storage pressure or fuel storage density having a certain safety margin from the minimum fuel storage pressure or from a minimum fuel storage density.

The removal limit value of the first pressure vessel can be, for example, an electronic signal which is indicative of the minimum amount of fuel which is or should be present in the pressure vessel. For example, the removal limit value can be indicative of the filling level and in particular of the state of charge, the fuel storage pressure or the fuel storage density. However, other values for the amount of fuel that are directly or indirectly indicative of the amount of fuel in the pressure vessel, for example the expansion of the pressure vessel, are also conceivable. In particular, the removal limit value can be indicative of the fact that the first or rear pressure vessel has been emptied to the maximally permissible state of emptying.

The removal limit value can alternatively or additionally be an electronic signal which is indicative of a limit temperature of the pressure vessel, in particular of a lower limit temperature that may not be fallen short of during the removal, for example because the pressure vessel and/or other fuel-conducting components have not been configured for lower temperatures. Equally, upper limit temperatures are conceivable during the filling.

The motor vehicle and in particular the pressure vessel system can be designed first of all to remove fuel substantially exclusively from the first or rear pressure vessel until the value indicative of the current filling level of the first or rear pressure vessel has reached or fallen short of the removal limit value. The value indicative of the current filling level of the first or rear pressure vessel can be of the same type as the removal limit value. The indicative value is preferably an electronic signal which is indicative of the amount of fuel which is currently stored in the pressure vessel. In this context, the term "substantially exclusively" means that, for the entire removal period following refueling and until the removal limit value is reached, fuel is removed exclusively from the first or rear pressure vessel or at least 70% or at least 80% or at least 90% of the fuel supplied by the pressure vessel system in the aforementioned entire removal period is removed from the first pressure vessel.

The motor vehicle can be designed so as, in addition to the removal of fuel from the first pressure vessel, to always simultaneously remove fuel from the second pressure vessel whenever the overall fuel rate to be supplied to the energy converter by the fuel cell system is greater than the maximally suppliable fuel rate of the first pressure vessel.

An (overall) fuel rate is expediently an (overall) volumetric flow or (overall) mass flow.

If, for example, such a large overall fuel rate is to be supplied to an energy converter that the first pressure vessel cannot supply this fuel mass flow because of a structural limitation (for example excessive supercooling), the second pressure vessel may alternatively be of assistance here. In particular, it can be provided that fuel is only removed from the first and the second pressure vessel substantially i) if the first pressure vessel can itself not supply the overall fuel rate to be supplied, and ii) the indicative value lies above the removal limit value. In other words, the motor vehicle can be designed so as to permit the removal from the second pressure vessel only i) if the value indicative of the filling level of the first pressure vessel has reached or fallen short of the removal limit value; or ii) if the value indicative of the filling level of the first pressure vessel has not reached or fallen short of the removal limit value but the overall fuel rate to be supplied is greater than the maximally suppliable fuel rate of the first pressure vessel; or iii) if the value indicative of the filling level of the first pressure vessel has not reached or fallen short of the removal limit value but the removal from the second pressure vessel is so low that over the entire removal period following refueling at least 70% or at least 80% or at least 90% of the fuel supplied by the pressure vessel system in the above-mentioned entire removal period is removed from the first pressure vessel.

According to the technology disclosed here, the motor vehicle or the pressure vessel system can be designed to undertake the filling of the pressure vessel system with fuel in such a manner (i.e. to subject the filling to closed loop control or open loop control in such a manner) that, when a filling limit value of the pressure vessel system that is indicative of the overall filling level of the pressure vessel system that is to be achieved by the refueling is reached or exceeded, the at least one second pressure vessel has a higher filling level than the at least one first pressure vessel.

The filling limit value can be, for example, an electronic signal which represents the entire amount of fuel in the pressure vessel system. When the filling limit value is reached or exceeded, the filling or refueling is expediently interrupted at the vehicle and/or at the filling station. The filling limit value is indicative of this overall filling level.

The overall filling level of the pressure vessel system is a filling level for the entire amount of fuel to be stored by the entire pressure vessel system after the filling or refueling.

The overall filling level is expediently produced from the filling levels of the individual pressure vessels of the pressure vessel system. According to the technology disclosed here, it can expediently be provided that the first pressure vessel and the second pressure vessel have different filling levels when the filling limit value is reached or exceeded. The at least one second pressure vessel preferably has a higher filling level than the at least one first pressure vessel. In other words, the pressure vessel system is designed to subject the filling to open loop control or closed loop control in such a manner that more fuel is stored in the second pressure vessel than in the first pressure vessel. Particularly preferably, no fuel is stored in the first pressure vessel or only so much fuel until the lower filling level is reached. In particular, it can be provided that, when a filling limit value is reached or exceeded at least by the factor of 1.0 or at least by the factor of 5.0 or at least by the factor of 10.0, more fuel is stored in the second fuel vessel than in the first fuel vessel.

The motor vehicle can be designed to determine the filling limit value
on the basis of user-related data (for example on the basis of at least one calendar entry or on the basis of the driving behavior, etc.);
on the basis of historical vehicle data;
on the basis of geoinformation; and/or
on the basis of user inputs.

The technology disclosed here furthermore relates to an operating method for a motor vehicle having a pressure vessel system, in particular for the motor vehicle disclosed here. The method can comprise the steps
i) according to which fuel is removed from the pressure vessel system in such a manner that, when a removal limit value that is representative of the lower filling level and/or a limit temperature of the first pressure vessel is reached or fallen short of, the second pressure vessel has a higher filling level; and/or
ii) according to which the pressure vessel system is filled with fuel in such a manner that, when a filling limit value that is indicative of the overall filling level of the pressure vessel system that is to be reached by the refueling is reached or exceeded, the at least second pressure vessel has a higher filling level than the first pressure vessel.

Furthermore, the structural features, which are mentioned in conjunction with the motor vehicle disclosed here, with regard to the interaction of the first and second pressure vessels should be disclosed as being consistent with the method.

The system disclosed here furthermore comprises at least one control unit. The control unit is designed inter alia to carry out the method steps disclosed here. For this purpose, the control unit can subject the actuators of the system at least partially and preferably completely to closed loop control or open loop control on the basis of signals which are supplied. The control unit can at least the pressure vessel system. Alternatively or additionally, the control unit can also be integrated in another control unit, for example in a master control unit. The control unit can interact with further control units of the motor vehicle.

In other words, the technology disclosed here relates to an operating strategy in which the rear tank is emptied first. Only when the latter is empty (for example residual pressure of approximately 20 bar) can removal proceed here from another tank (second pressure tank) or from the remaining tanks together.

The effect which can be achieved with the technology disclosed here is that the safety of such motor vehicles can be increased further, and/or that the individual pressure vessels can be differently dimensioned according to the intrusion probability, which can have a positive effect on the component costs, weight and/or construction space.

The technology disclosed here will now be explained with reference to the figures.

BACKGROUND AND SUMMARY OF THE INVENTION

Figure 1:
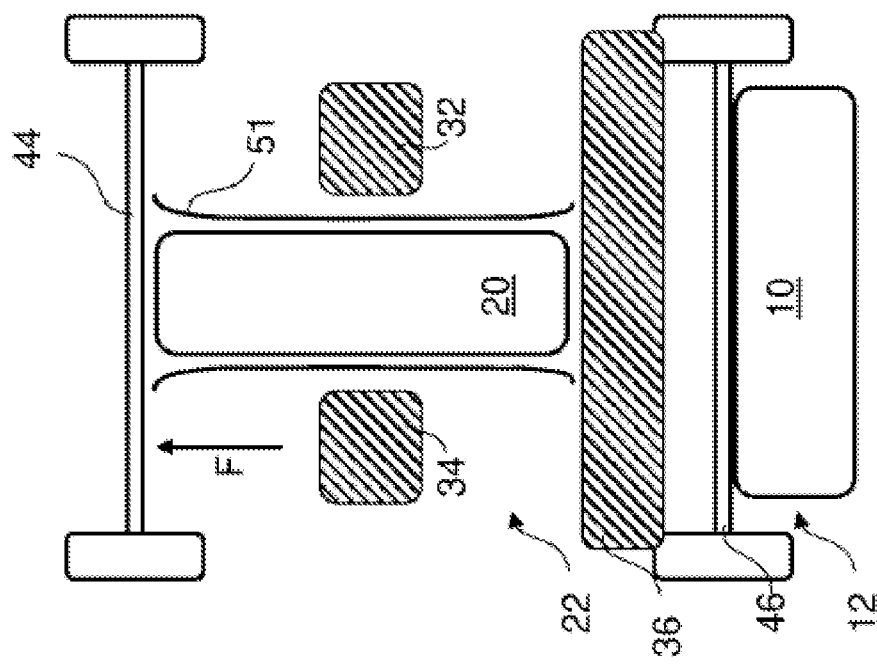
Figure 3:
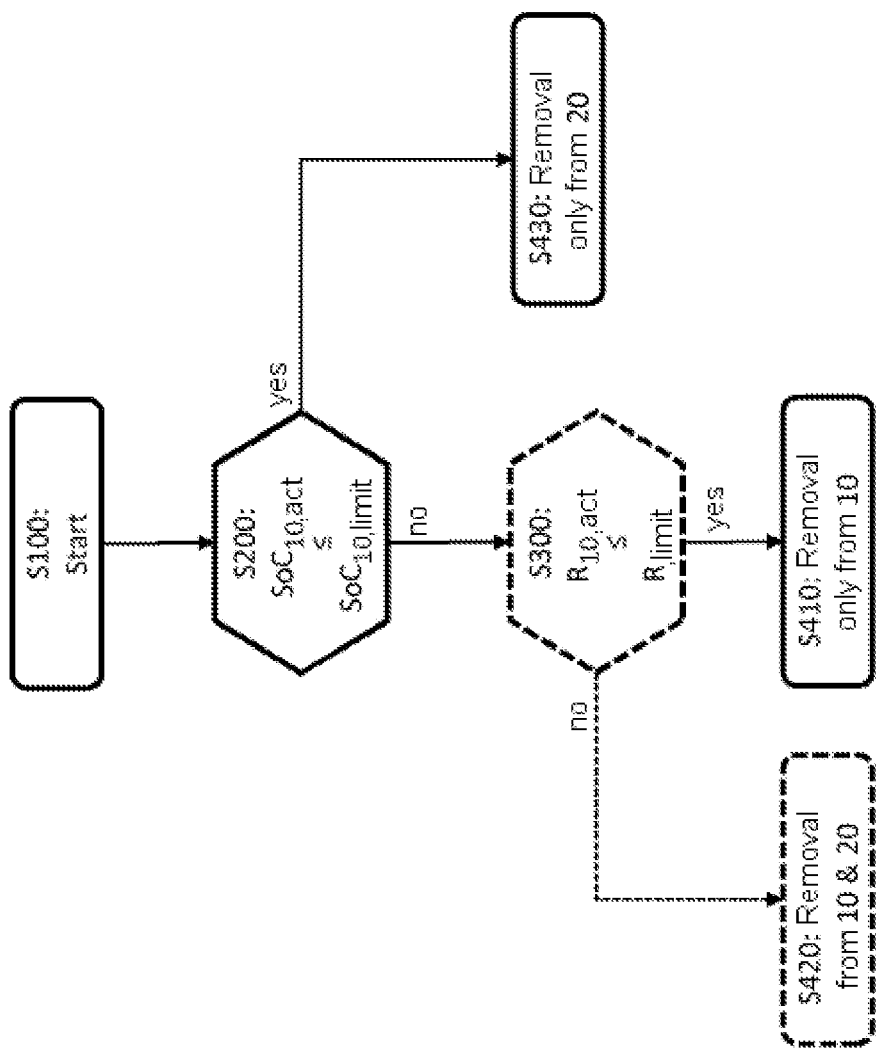

FIG. 1 shows a schematic view of a motor vehicle disclosed here;
FIG. 2 shows a schematic view of a motor vehicle disclosed here; and
FIG. 3 shows a schematic diagram for explaining a method disclosed here.

DETAILED DESCRIPTION OF THE DRAWINGS

FIG. 1 shows a schematic top view of a motor vehicle according to the technology disclosed here. A large number of components of the motor vehicle have been omitted for simplification purposes. The arrow F denotes the direction of travel of the motor vehicle. The center tunnel 51 is arranged here between the front vehicle axle or front axle 44 and the rear vehicle axle or rear axle 46. Furthermore, the front seats 32, 34 and the rear seat bench 36 are shown here. These elements can be arranged as desired depending on the configuration of the motor vehicle. Behind the rear axle 46, the first pressure vessel 10 is arranged here in the first region 12. The first region 12 is directly adjacent here to the trunk. The intrusion probability in said first or rear region 12 is higher than the intrusion probability in the second region 22. For example, the region between the rear axle 46 and the front axle 44 can be assumed here to be the second region 22. This second region 22 has a lower intrusion probability in comparison to the first region 12. As a rule, this second region 22 can be formed by the passenger cell which is reinforced in comparison to the crumple zone. The second pressure vessel 20 is at least partially formed here in the center tunnel 51. The region in the center tunnel 51 is particularly well protected against intrusion. The second pressure vessel 20 could also be arranged at another point within the second region 22.

In the description below of the alternative exemplary embodiment illustrated in FIG. 1, the same reference signs are used for features which are identical and/or at least comparable in their configuration and/or operation in comparison to the first exemplary embodiment illustrated in FIG. 1. If these features are not explained in detail once again, the configuration and/or operation thereof corresponds to the configuration and/or operation of the features already described above.

The two lateral sills 53, 55 are shown in FIG. 2. Two first pressure vessels 10, 10 are in each case at least partially accommodated here in each of these sills 53, 55. The sills 53, 55 are subject to a higher intrusion probability than the center tunnel 51. Consequently, the first pressure vessels 10, 10 which are at least partially arranged in the sills 53, 55 are arranged in a first region 12 which has a higher intrusion probability in comparison to the second region 22, which is at least partially formed here by the center tunnel 51. The second pressure vessel 20 is at least partially accommodated here in the center tunnel 51.

The combination of the configuration according to FIGS. 1 and 2 is likewise conceivable. In other words, the configuration according to FIG. 2 could thus have a further first pressure vessel which is formed behind the rear axle. In such a configuration, it can be provided that the first pressure vessel which is subject to the greatest intrusion probability in comparison to all of the pressure vessels is emptied first or filled the least.

FIG. 3 shows the method disclosed here. The method begins with step S100. In step S200, it is checked whether the value $SoC_{10,act}$, that is representative indicatively of the filling state of the first pressure vessel 10, has reached or fallen short of the removal limit value $SoC_{10,limit}$. If this is the case, the fuel is not removed from the first pressure vessel 10, but rather exclusively from the second pressure vessel 20 (cf. S430). If in the meanwhile the removal limit value $SoC_{10,limit}$ is not reached or fallen short of, the method is continued here with the optional step S300 (illustrated by dashed lines). It is checked in step S300 whether the overall fuel rate to be supplied to an energy converter by the pressure vessel system is smaller than or equal to the maximally suppliable fuel rate $R_{10,act}$ of the first pressure vessel 10. If this is the case, the first pressure vessel 10 can supply a sufficient fuel mass flow. In this case, in step S410, the removal of fuel takes place only from the first pressure vessel 10. If this is not the case, in step S420, fuel is removed both from the first pressure vessel 10 (preferably at the maximum removal rate $R_{10,act}$) and from the second pressure vessel 20. The diagram does not show the enquiry as to whether filling has taken place in the meantime, wherein if filling of the pressure vessel system has taken place in the meantime, step S200 is proceeded with.

For the sake of legibility, the expression "at least one" has in part been omitted for the sake of simplicity. If a feature of the technology disclosed here is described in the singular or indeterminate (for example, the/a first or second pressure vessel, the/a first or second region, etc.), the disclosure is simultaneously also intended to encompass the plural thereof (for example, the at least one first pressure vessel, the at least one second pressure vessel, the at least one first region, the at least one second region, etc.). The term "substantially" (for example "substantially exclusively") in the context of the technology disclosed here in each case comprises the precise property or the precise value (for example "exclusively") and deviations that are in each case insignificant for the functioning of the property/of the value (for example "tolerable deviation from exclusively").

The above description of the present invention serves merely for illustrative purposes and not for the purposes of limiting the invention. In the context of the invention, numerous changes and modifications are possible without departing from the scope of the invention and its equivalents.

What is claimed is:

1. A motor vehicle having a pressure vessel system, comprising:
   a plurality of pressure vessels,
   wherein
      at least one first pressure vessel of the plurality of pressure vessels is arranged in a first region of the motor vehicle,
      at least one second pressure vessel of the plurality of pressure vessels is arranged in a second region of the motor vehicle,
      the motor vehicle is configured to remove fuel from the pressure vessel system in such a manner that, when a filling level or a limit temperature of the at least one first pressure vessel is equal to or less than a removal limit value of the at least one first pressure vessel corresponding to a lower filling level limit or a limit temperature of the at least one first pressure vessel, fuel is drawn from the least one second pressure vessel when the at least one second pressure vessel has a higher filling level, and
      the motor vehicle is configured such that during filling of the pressure vessel system with fuel, when a filling limit value of an overall filling level of the pressure vessel system is reached or exceeded, the at least second pressure vessel has a higher filling level than the first pressure vessel.

2. The motor vehicle according to claim 1, wherein
   the first region has a higher intrusion probability than the second region.

3. The motor vehicle according to claim 2, wherein
   the at least one first pressure vessel is one or both of
   at least partially arranged one or both of behind a rear seat bench of the motor vehicle and at least partially behind a rear axle of the motor vehicle, and
   at least partially accommodated in at least one sills of the motor vehicle.

4. The motor vehicle according to claim 3, wherein
   the at least one second pressure vessel is one or both of
   at least partially arranged in front of the at least one first pressure vessel, and
   at least partially arranged between one or both of the sills and at least partially in a center tunnel of the motor vehicle.

5. The motor vehicle according to claim 1, wherein
   the pressure vessel system is configured to remove the fuel substantially exclusively from the first pressure vessel until the filling level or the limit temperature of the at least one first pressure vessel is equal to or less than the removal limit value.

6. The motor vehicle according to claim 1, wherein
   the motor vehicle is configured to remove fuel from the at least one first pressure vessel and simultaneously to remove fuel from the at least one second pressure vessel when an overall fuel rate to be supplied to an energy converter by the pressure vessel system is greater than a maximum fuel supply rate of the at least one first pressure vessel.

7. The motor vehicle according to claim 1, wherein
   the motor vehicle is configured to predictively determine the filling limit value of the pressure vessel system on the basis of one or more of user-related data, historical vehicle data, geoinformation, and user inputs.

8. An operating method for a motor vehicle having a pressure vessel system, wherein the pressure vessel system comprises a plurality of pressure vessels, at least one first pressure vessel of the plurality of pressure vessels is arranged in a first region of the motor vehicle, and at least one second pressure vessel of the plurality of pressure vessels is arranged in a second region of the motor vehicle, comprising the acts of:
   removing fuel from the pressure vessel system in such a manner that, when a filling level or a limit temperature of the at least one first pressure vessel is equal to or less than a removal limit value of the at least one first pressure vessel corresponding to a lower filling level limit or a limit temperature of the at least one first pressure vessel, fuel is drawn from the least one second pressure vessel when the at least one second pressure vessel has a higher filling level; and
   filling the pressure vessel system with fuel such that when a filling limit value of an overall filling level of the pressure vessel system is reached or exceeded, the at least second pressure vessel has a higher filling level than the first pressure vessel.

9. An operating method for a motor vehicle having a pressure vessel system, wherein the pressure vessel system comprises a plurality of pressure vessels, at least one first pressure vessel of the plurality of pressure vessels is arranged in a first region of the motor vehicle, and at least one second pressure vessel of the plurality of pressure vessels is arranged in a second region of the motor vehicle, comprising the act of:

filling the pressure vessel system with fuel such that when a filling limit value of an overall filling level of the pressure vessel system is reached or exceeded, the at least second pressure vessel has a higher filling level than the first pressure vessel.

10. An operating method for a motor vehicle having a pressure vessel system, wherein the pressure vessel system comprises a plurality of pressure vessels, at least one first pressure vessel of the plurality of pressure vessels is arranged in a first region of the motor vehicle, and at least one second pressure vessel of the plurality of pressure vessels is arranged in a second region of the motor vehicle, comprising the acts of:

removing fuel from the at least one first pressure vessel when a filling level or a limit temperature of the at least one first pressure vessel is greater than a removal limit value of the at least one first pressure vessel corresponding to a lower filling level limit or a limit temperature of the at least one first pressure vessel;

when the filling level or the limit temperature of the at least one first pressure vessel is equal to or less than the removal limit value of the at least one first pressure vessel corresponding to the lower filling level limit or the limit temperature of the at least one first pressure vessel, fuel is drawn from the least one second pressure vessel when the at least one second pressure vessel has a higher filling level;

when an overall fuel rate to be supplied to an energy converter by the pressure vessel system is greater than a maximum fuel supply rate of the at least one first pressure vessel, removing fuel from the at least one second pressure vessel in an amount that is sufficient to meet the overall fuel rate to the supplied to the energy converter; and filling the pressure vessel system with fuel such that when a filling limit value of an overall filling level of the pressure vessel system is reached or exceeded, the at least second pressure vessel has a higher filling level than the first pressure vessel.

\* \* \* \* \*